United States Patent Office 3,303,629
Patented Feb. 14, 1967

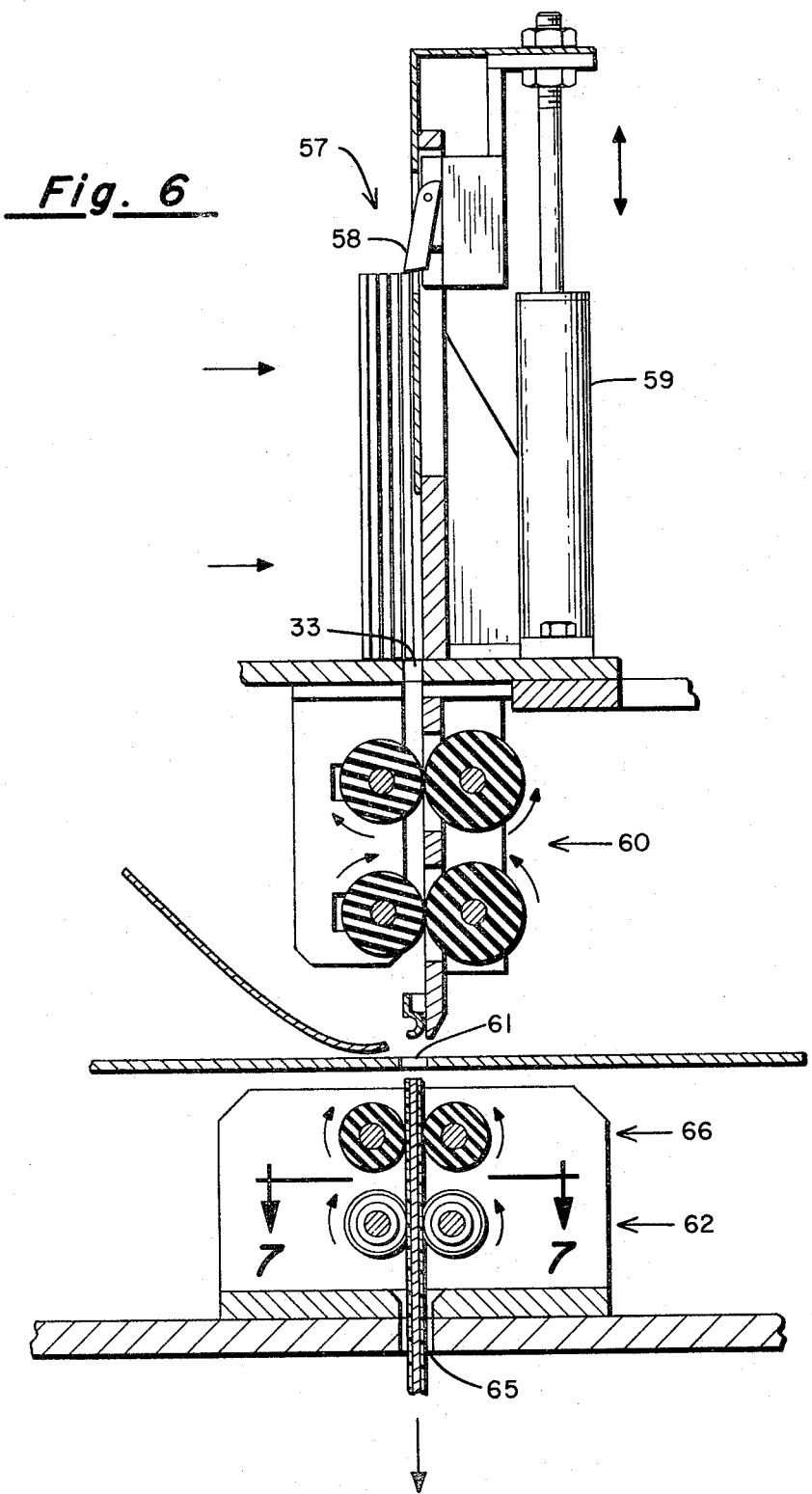

3,303,629
PACKAGING WITH THERMOPLASTIC MATERIALS
Carl J. Tobin, Lackawanna, N.Y., assignor to Gould-National Batteries, Inc., a corporation of Delaware
Filed Feb. 3, 1964, Ser. No. 341,899
5 Claims. (Cl. 53—28)

This invention relates generally to apparatus and method for packaging articles in sheets of heat-sealable plastic material. More particularly the invention is directed toward improving apparatus and method for sealing together the edges of said material to form packaging containers.

Heretofore, heat-sealing of sheets of thermoplastic material has generally been performed by applying heat to the material while pressing the pieces together. This is followed by a cooling period during which the seal is allowed to set. Since the heat had to be applied to the outer surface or surfaces of the sheets being sealed together, it had to be of sufficient degree and duration to allow the inner facing surfaces to reach the sealing temperature. This method is not only slow and time consuming, but it has been found that polyethylene was being drawn away from the inner facing surfaces which are to be sealed resulting in a seal which lacks reliability and uniformity. Furthermore, the excess heat which had to be directed upon the outer surface in order to bring the inner surface to the proper sealing temperature would sometimes damage the plastic material by charring it or causing it to flow, thus creating weak spots or irregular surfaces.

It is, therefore, a general object of this invention to provide improved method and apparatus for packing with sheets of thermoplastic material.

A more specific object is to provide a method and apparatus for heat sealing thermoplastic material at a rate not heretofore possible.

Another object of this invention is to achieve the foregoing object while providing reliable and uniform sealing.

Still another object of this invention is to provide a method for heat sealing thermoplastic material which substantially reduces the required temperature of the applied heat thereby reducing production costs and the likelihood of damage to materials.

Yet another object is to provide apparatus for applying heat to thermoplastic sheets directly on the surface which is to be sealed.

A further object is to provide a method and apparatus for producing heat-sealed packaging envelopes and sleeving from sheets of thermoplastic material.

A still further object is to provide in a packaging machine apparatus which folds a thermoplastic sheet and presses previously heated edges together to form a heat-sealed envelope.

Still a further object of the invention is to provide a machine which reduces the cost of heat-sealing thermoplastic sheets by increasing volume of production and reducing requirements for operator attendance.

Yet still a further object of this invention is to provide a method and apparatus for bending an otherwise brittle plastic without breaking or cracking.

A still more specific object is to provide automatic machinery to produce envelope separators for storage battery plates.

Another object is to provide a machine for forming storage battery plate separator envelopes by heat bending and heat-sealing thermoplastic sheets to enclose the battery plate on at least three sides.

Yet another object is to provide a machine of the immediately foregoing object which will produce envelope separators in quantity and of a quality necessary for economical production.

Still another object is to provide a compact, durable and relatively simple machine which requires a minimum of maintenance for producing envelope separators for batteries.

In the preferred embodiment of this invention, which will be later described in greater detail, heat is applied directly to and in intimate contact with the sealing surface of the thermoplastic sheet or web to raise it to the sealing temperature. Pressure plates or rollers, or the like, press the heated surface into sealing contact and allow the seal to set. Preferably, this is achieved while the web is continuously moving and the packets or packaging containers may be cut to desired size after or while being formed in this manner. Apparatus for effecting the foregoing method may include means for bending the thermoplastic material to form envelopes from a single web or may include means for heating and pressing together the edges of two sheets or webs to form sleeving.

These and other objects and features will become apparent from the following detailed description, reference being made to the accompanying drawings in which:

FIG. 6 shows in detail the terminating or ejecting end of the machine as viewed along section line 6—6 of FIG. 5;

In the drawings, similar reference numbers designate the same or equivalent parts.

Figure 1:
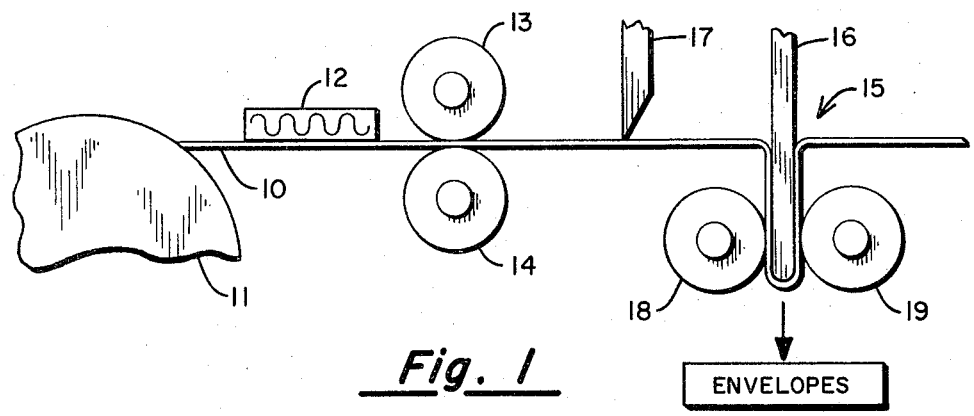
FIG. 1 is a functional illustration of an embodiment of this invention for producing envelopes having three closed edges from a single web of thermoplastic material.

Referring now to the functional illustration of an embodiment of this invention as shown in FIG. 1, a web or sheet of thermoplastic material 10 is continuously unrolled from a supply reel 11 and conveyed past a heating unit 12 by upper and lower friction drive rollers 13 and 14 respectively. At least part of the upper facing surface of webbing 10 is in direct and intimate contact with the heating unit 12 as it is moving therepast so that as the webbing is transported past the heating unit the temperature on the upper facing surface is brought up to the degree required for heat sealing. Downstream from the drive rollers 13 and 14 the webbing 10 is bent or folded, which may be done as indicated at 15 by a folding mandrel 16 to form an enclosure having both of the inner facing surfaces formed from the surface of the webbing 10 which have been preheated to sealing temperature.

In some instances it may be necessary to apply additional heat to the thermoplastic material over a narrow area across its width in order to be able to bend the material without rupturing it. This, of course, will depend on the characteristics of the material.

As the folding mandrel is directed downward to bend or fold the right hand length of webbing, the desired length is cut off or sheared such as by a cutting blade 17. As the sheared-off length of folded-back webbing is drawn past seal-set rollers 18 and 19, pressure is applied by these rollers along the side edges of the webbing to force the facing surfaces along the side edges into sealing contact thereby forming a packet or envelope which is closed tightly along three edges. The folding mandrel 16 is then withdrawn upward until another length of the webbing is in position and a new cycle is initiated.

In the thermoplastic material being processed in this manner, polyethylene is drawn to the surface which is directly heated so that directly heating the mating surfaces of the seal takes advantage of this characteristic to effect a reliable and uniform seal. Preferably the heating unit should be in intimate contact with the surface being directly heated so that no insulating air gap exists between the thermoplastic material and the heating element which could prevent uniform heating. The presence of an air gap could result in erratic and unreliable seals which may contain air pockets or other voids.

Figure 2:
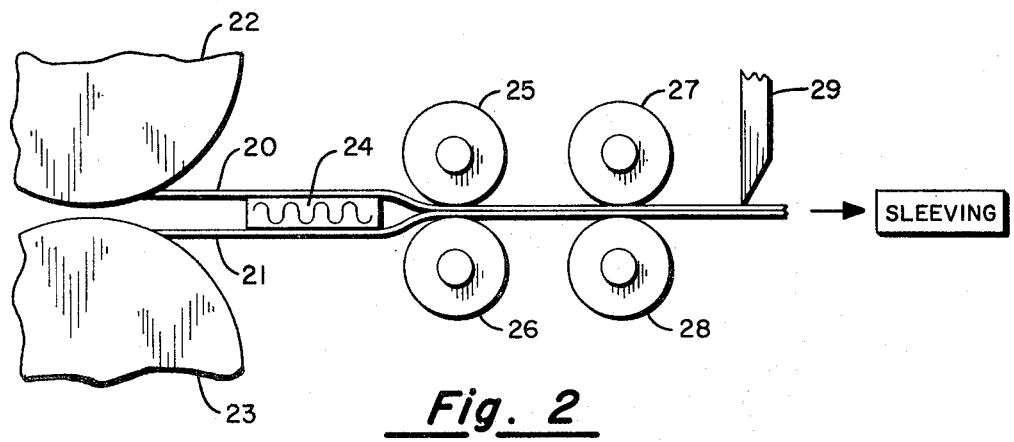
FIG. 2 is a functional illustration of another embodiment of this invention for producing sleeving from two webs of thermoplastic material.

The functional operation of a further adaptation of this invention is illustrated in FIG. 2 wherein two webs of thermoplastic material, 20 and 21, are continuously conveyed from their respective supply reels 22 and 23 and are respectively transported above and below but in intimate contact with heating unit 24 which brings the inner facing surfaces of the webbings up to sealing temperature. The upper web 20 is brought into overlying relationship with the lower web 21 and the two inner facing surfaces are compressed into sealing contact with one another lengthwise along their edges as the webbing is transported past seal set rollers 25 and 26. The drive rollers 27 and 28 illustrate a means for frictionally driving the webbing to unreel it from the supply reels. A cutting blade 29 or other convenient means can be incorporated to shear the sleeving thus formed into appropriate lengths, if desired.

Figure 3:
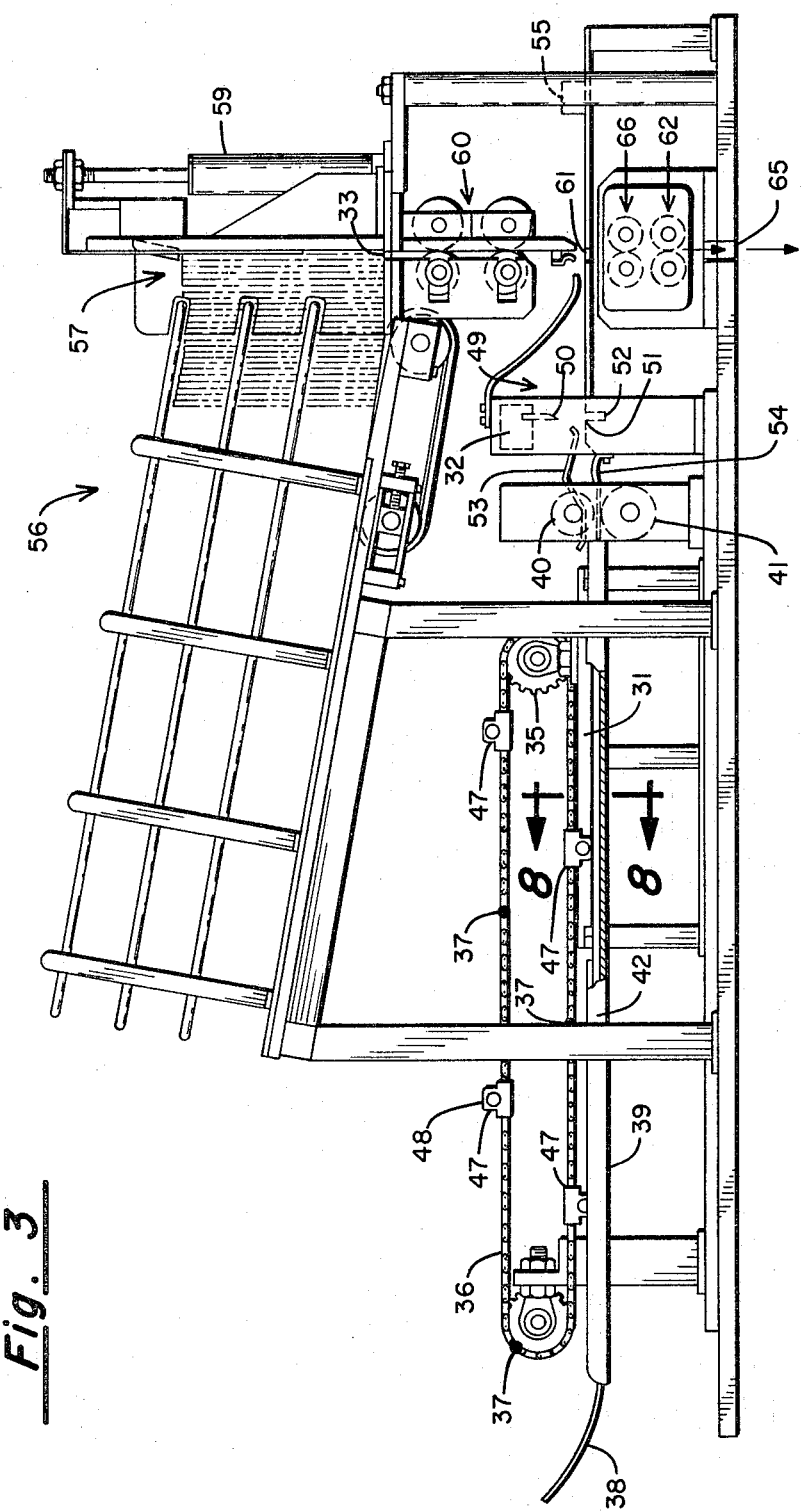
FIGS. 3, 4 and 5 are respectively side, top and end views showing structural details of a device constructed to function as illustrated in FIG. 1.
Figure 4:
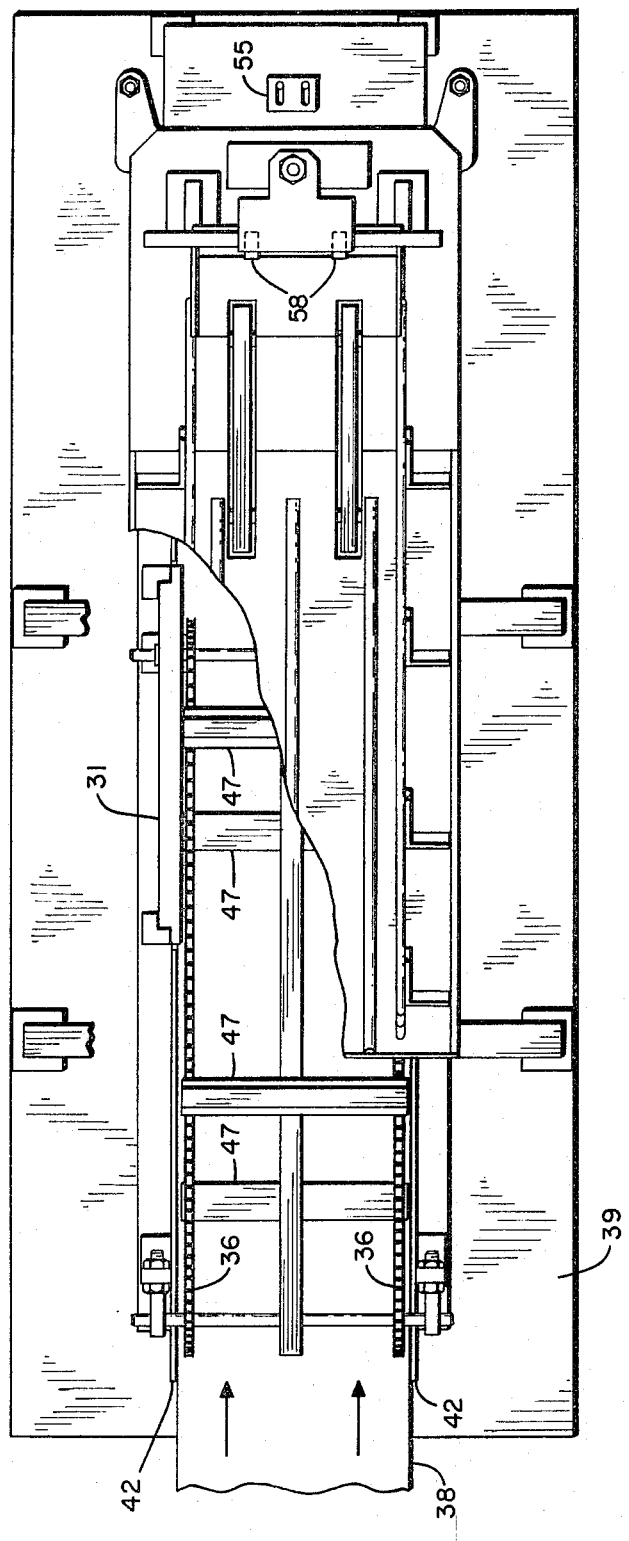
Figure 5:
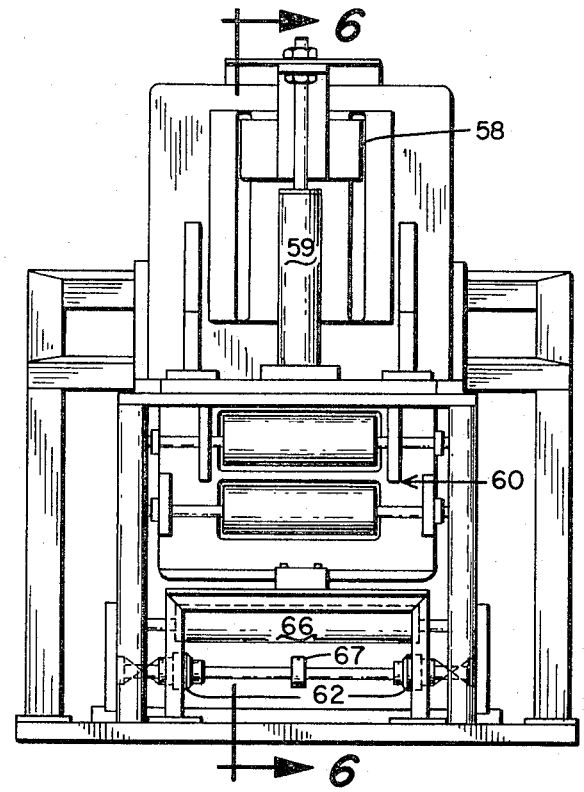

FIGS. 3, 4 and 5 are respective the side, top and terminal end views showing details of an embodiment of this invention constructed to operate in a manner generally described by the functional diagram of FIG. 1. The machine illustrated in these figures is used to package rectangular-shaped, flat storage battery plates in separator enevelopes which are made of a porous thermoplastic material. The separators serve a multiple purpose by retaining active material on the battery plates thereby increasing the life expectancy of the battery and electrically insulating the negative and positive plates from direct contact with one another while still permitting the electrolytic action. Additionally, by encasing the battery plate in an envelope which is closed along at least three edges it is protected against damage during subsequent handling prior to and during assembly into the battery itself. Furthermore, this type of packet is compact so that when assembled into the battery it provides a battery of optimum capacity for a given volume.

Main drive power for the illustrated machine is obtained from a motor, not shown, which, through appropriate linkages in the form of endless chains or belts and the like, drives the various rollers including sprocket 35 which drives endless belt 36. The various operations of the machine are synchronized by appropriate linkages including selected gear ratios and the like and are further synchronized by a set of control pins 37 which are carried by endless belt 36 to control the on-off operation of strategically located microswitches (not shown). These, in turn, control the operation of various functional mechanisms located throughout the machine.

Figure 8:
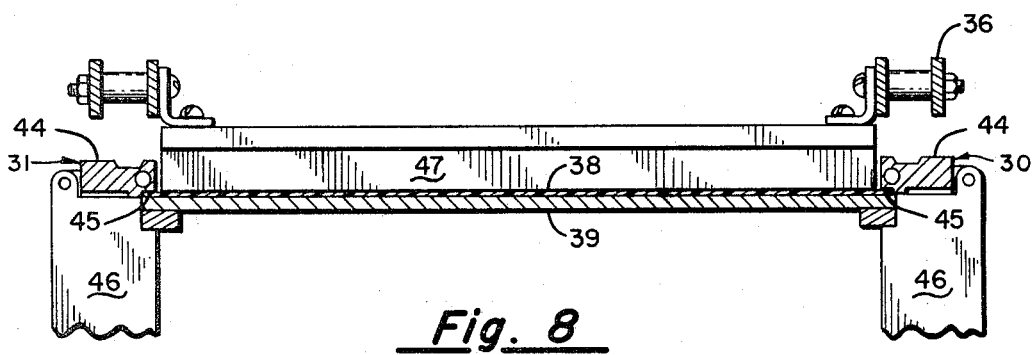
FIG. 8 illustrates some of the construction details of the heater units as viewed along section line 8—8 of FIG. 3.

The thermoplastic sheet or webbing 38 lies horizontally on supporting table 39 as it is being unwound from the supply reel (not shown) by the friction drive rollers 40 and 41. Elongated edge guides 42 along the two side edges of the support table 39 direct the passing of the webbing 38 down the support table in the proper orientation. Located on the upper surface of the support table 39 between the supply reel and the drive rollers 40 and 41 are a pair of side edge heater units 30 and 31. Some of the structural details of these edge heaters are more clearly shown in FIG. 8. An aluminum heater block 44 contains an electrical heater cartridge (not shown) which is energized by any conventional electrical source. The heater block is hinged to support 46 and the bottom face 45 of the heater block rests on the edges of the upper facing surface of the thermoplastic webbing as it is transported past the heater units and remains in intimate and direct contact with the edges to elevate them to the required temperature for sealing. As pointed out previously, applying the heat to the upper facing surface tends to cause polyethylene to be pulled toward this heated surface which is a factor which ultimately results in a reliably tight and uniform seal. The temperature setting of the heater unit is, of course, dependent upon the type of material, the feed rate of the material and the length of the heating unit. In a typical case using a thermoplastic material designated "Nalcon," a product of National Lead Company, the length of the heater is 12¼ inches, the Nalcon is fed at a rate of 15 feet per minute and the temperature of the heater unit is in the range of 400° to 470° F.

Attached to the endless belt 36 to travel along therewith are center heater units 47 which extend across the webbing between the side edge heaters. When a center heater 47 is traveling along with the bottom reach of the endless belt 36, its heating face 48 is in direct contact with the upper facing surface of the webbing 38 along a narrow strip extending substantially across the width of the webbing (FIG. 4). Nalcon and similar types of material suitable for use as separators are characterized by being somewhat brittle so that they have a tendency to crack or rupture when being bent. By elevating the temperature of a section of the webbing in the general area of the anticipated fold line by the center heater 47, it is made pliable enough so that it can be bent without cracking.

Downstream of the driving rollers 40 and 41 is a shearing station, indicated generally at 49, which may comprise a movable knife edge 50 and a fixed knife edge 51 formed along a top edge of slot 52. One of the control pins 37 on the endless belt 36 closes a microswitch at the appropriate time in the cycle of operation which in turn energizes a solenoid or an air cylinder 32 or the like which drives the movable knife edge 50 downward into the slot 52 and severs the webbing along the fixed knife edge 51. After cutting off the appropriate length, the movable knife edge is withdrawn upward to the rest position as shown in the drawing.

Between the cutting station 49 and the drive rollers 40 and 41 are a pair of vertically spaced-apart guide plates 53 and 54. Since the drive rollers are continuously moving the webbing downwstream there is a tendency for the material to fold back on itself during the cutting operation of shearing mechanism 49. Guide plates 53 and 54 tend to direct and limit this fold-back to prevent buckling, cracking or snagging of the material. The cutting operation is of short enough duration so that the fold-back occurs only to a limited degree and damage is easily prevented by the plates 53 and 54. When the movable cutting tool 50 is withdrawn upward, the webbing continues its downstream course past the cutting station until another cutting stroke is initiated. The cutting stroke of the shearing mechanism 49 is timed by the placement of a control pin 37 on the endless belt 36 so that the cut occurs at about the time that the leading edge of the webbing strikes a stop plate 55 which is located toward the farthest righthand end of the support table.

Figure 7:
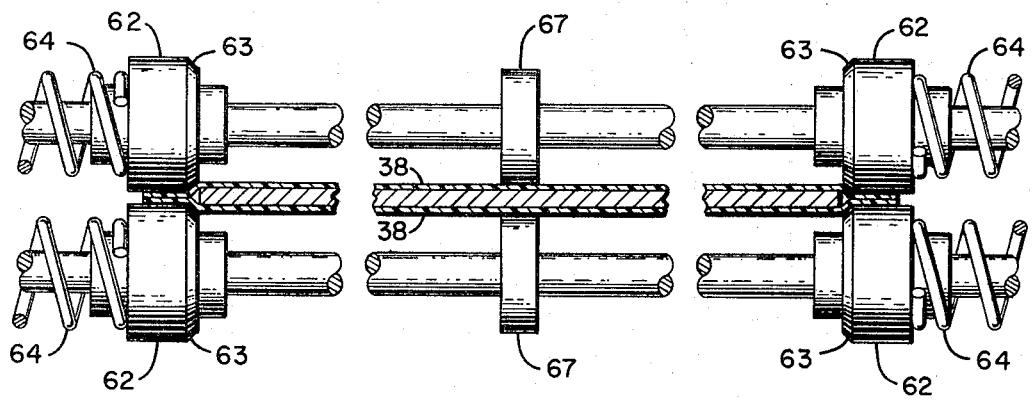
FIG. 7 shows some detail of the seal-set rollers as viewed along section line 7—7 of FIG. 6.

Disposed above the support table 39 is a slanted hopper, generally designated 56, containing a stack of rectangularly-shaped, flat battery plates indicated by shadow line in FIG. 3. The hopper is tilted as shown to direct the plates rightward toward an ejector chamber, generally designated 57, while in a standing position, as shown. Some of the details of the mechanism in the ejection chamber are more clearly shown in FIGS. 5 and 6. A stripper mechanism 58 is in contact with the upper edge of the rightmost plate in the stack and ejects this plate downward through a slot 33 toward the severed length of thermoplastic webbing which lies on the support table. The ejector stroke of the stripper mechanism is controlled by a solenoid 59 which is electrically activated by a microswitch, not shown, closed at the appropriate time by another of the control pins 37 on the endless belt 36. As the battery plate is pushed downward through the bottom of the hopper a further set of roller wheels, generally designated 60, pulls and guides the plate downward so that its bottom edge strikes the upward facing surface of the webbing directly above slot 61 in the support table to force the webbing downward causing it to fold up and around the front, back and sides of the battery plate. Synchronization of the mechanisms is such that the narrow area of the webbing, which had been previously heated by the center heater 47, is located directly above slot 61 at this time so that the material is sufficiently pliable at the fold line to be bent without cracking. The battery plate serving as a folding mandrel is thereby encased in covering layers of the thermoplastic webbing with the inner facing surfaces of said covering layers being the surface which had been previously directly and intimately raised to sealing temperature by the edge heating units 30 and 31. The width of the webbing is appropriately selected in relation to the width of the battery plate so that there are overhanging marginal edges of the covering material which are pressed into sealing contact with one another during the downward travel of the enclosed plate by set rollers 62. Forming rollers 66 force the covering material tightly onto the faces of the battery plate thereby making a very compact package. FIGS. 5, 6 and 7 illustrate this most clearly. The innermost faces of set rollers 62 are tapered as shown at 63. The set rollers are spring biased axially toward each other by springs 64 and spring biased radially toward the inner faces of contact with the battery plate by additional springs, not shown. The combination of spring bias and tapered edge causes the matched set rollers 62 to slip toward the outside edge of the battery plate and compress the edges of the heated plastic material together to form a tight seal. The matched set rollers form a seal which conforms very closely to the edge of the battery plate because the rollers automatically adjust to the irregularities of the battery plate while maintaining a sufficient compressive force upon the plastic material interfaces to form a tight seal. Roller 67, on the same axle as the set rollers, prevents bulging of the plastic material along the center of the battery plate as the seal is being formed.

The set rollers further serve to propel the battery plate, now encased in the envelope, downward and out through an exit slot 65 from where it is conveyed, by means not shown, for further processing or storage.

In the alternative, if it is desired to produce empty envelopes which can be used for packaging articles, hopper 56 can be removed and a single plate member can serve as a folding mandrel in the same manner as previously described. The mandrel is driven downward and withdrawn upward in an oscillatory fashion at a continuous predetermined rate with the formed envelopes being ejected through an exit slot in the same manner as previously described. These envelopes can be used for packaging various articles and can be completely closed by sealing off the upper edge after the article is inserted, if desired. Sizes and shapes of packaging containers or envelopes formed in this manner can be easily changed and varied simply by changing the size or shape of the folding mandrel and repositioning the set rollers 62. Additionally, of course, the width of the webbing material would generally be changed for the selected size of envelope.

A further alternative construction of a machine to carry out the method of this invention is one which would function in a manner functionally illustrated in FIG. 2. Two separate overlaying webs of thermoplastic material would be continuously unwound from their respective supply reels and carried past side edge heating units. These heating units would be similar in construction to heaters 44 of FIG. 8 but would be double sided so that the edges of the downward facing surface of the upper plastic webbing would be in intimate contact with the upper facing surface of one set of heating units while the upper facing surface of the lower sheet would be in intimate contact with the lower facing surface of the other set of heating units. This would bring the edges of the inner facing surfaces of the material up to their sealing temperatures in the desired manner. Preferably, setting rollers similar to rollers 62 of FIG. 3 would be located where drive rollers 40 and 41 are located (FIG. 3) to press the edges of the facing surfaces into sealing contact to seal the sheets of webbing together as they are transported therepast. Drive rollers similar to 40 and 41 may be located downstream from the setting rollers to continuously draw the material from the supply reels and move it downstream to an exit slot toward the right hand end. This would produce a continuous length of packaging in sleeve form. A shearing mechanism, similar to that shown at 49 in FIG. 3, can be incorporated to cut the sleeving into predetermined lengths if desired. Obviously this would further require some synchronization control to ensure that the sleeving is cut to the desired lengths.

It is contemplated that there are many possible variations of embodiments which can be constructed according to the teachings of this invention to produce a wide variety of packaging units using a wide variety of thermoplastic packaging materials. It should be recognized that the embodiments described are intended to be illustrative and not limitive and any typical figures of merit contained herein relating to the operation of the invention are also intended to be solely illustrative and not limitive.

I claim:

1. In a packaging machine, in combination: heating means in intimate and direct contact with at least a part of only one surface of a sheet of heat-sealable material for heating said part of said surface to sealing temperature; means for heating a narrow strip of said same one surface across said sheet to a temperature at which said material will bend without breaking; means for folding said sheet along said latter strip so that said heated parts of said one surface are facing each other; and means in contact with the other surface of said sheet for pressing said heated facing surface parts into sealing contact with one another.

2. In a packaging machine of the nature described, in combination: first heating means in intimate and direct contact with at least a part of only one surface of a moving sheet of heat-sealable material for heating at least part of said one surface to sealing temperature along its direction of travel as it is moving past the heating means; second heating means for heating a narrow strip of said same one surface transverse to the direction of travel to a temperature at which the material will bend without breaking; means for bending said material along said latter strip to bring said heated parts of said one surface in facing relationship; and means for pressing said facing heated parts of said one surface into sealing contact with one another.

3. In a packaging machine of the nature described, in combination: driving means for continuously moving an elongated web of heat sealable material lengthwise past a heating station; said station comprising first heating means in intimate and direct contact with the side edges of only one surface of said web for heating said one surface edges to sealing temperature as the web is moved therepast, and second heating means for heating a narrow strip of the same one surface across the width of said web to a temperature at which the material will bend without breaking; means for directing an edge of a plate member onto said heated narrow strip on said one surface for bending the web along said strip to bring said heated side edges of said one surface into facing relationship; and means for pressing said facing heated side edges of said one surface into sealing contact with one another.

4. The machine as in claim 3 wherein said side edges are sealed with the plate member enclosed between the facing surfaces.

5. The machine as in claim 4 further including shearing means for selectively cutting the web so that said plate is encased in an envelope closed on three edges.

References Cited by the Examiner

UNITED STATES PATENTS

| 2,195,740 | 4/1940 | Salfisberg | 53—28 |
| 2,451,794 | 10/1948 | Balsam et al. | 18—19 |
| 2,577,183 | 12/1951 | Denton. | |
| 2,579,415 | 12/1951 | Carson | 53—28 |
| 2,624,164 | 1/1953 | Donofrio | 53—28 |
| 2,627,629 | 2/1953 | Triolo | 18—19 |

GRANVILLE Y. CUSTER, JR., *Primary Examiner.*